2 Sheets--Sheet 1.

F. W. GRIFFITH & G. P. BYRNE.
Printing-Press.

No. 168,635. Patented Oct. 11, 1875.

WITNESSES:

INVENTOR:
F. W. Griffith and
Geo. P. Byrne
BY
ATTORNEYS.

F. W. GRIFFITH & G. P. BYRNE.
Printing-Press.

No. 168,635.

Patented Oct. 11, 1875.

UNITED STATES PATENT OFFICE.

FREDERICK W. GRIFFITH AND GEORGE P. BYRNE, OF NEW YORK, N. Y.

IMPROVEMENT IN PRINTING-PRESSES.

Specification forming part of Letters Patent No. 168,635, dated October 11, 1875; application filed March 1, 1875.

*To all whom it may concern:*

Figure 1:
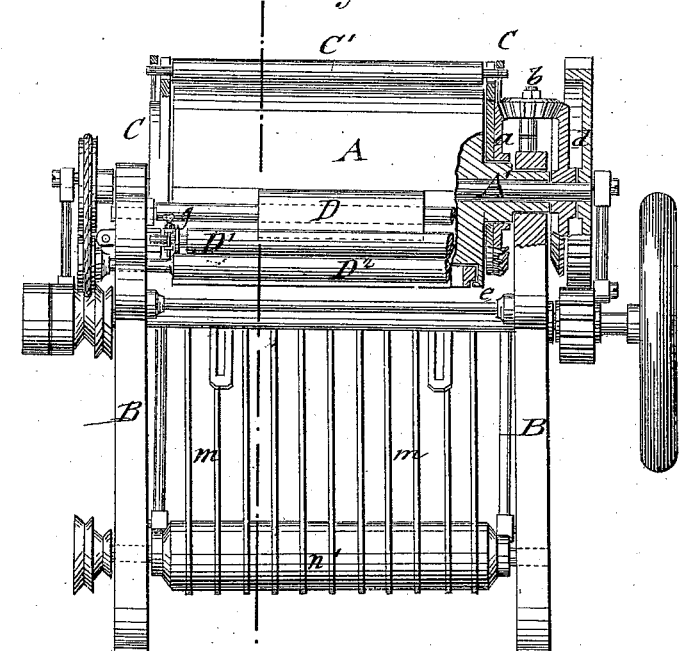
Figure 2:
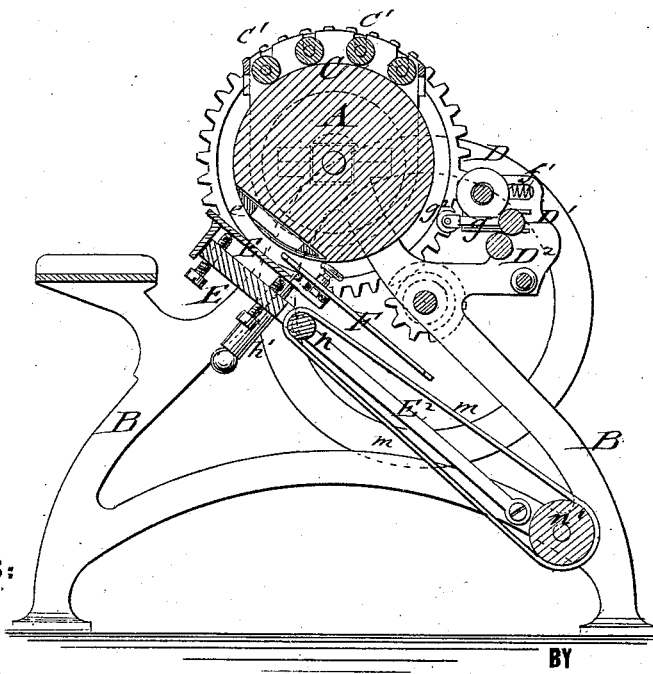
Figure 3:
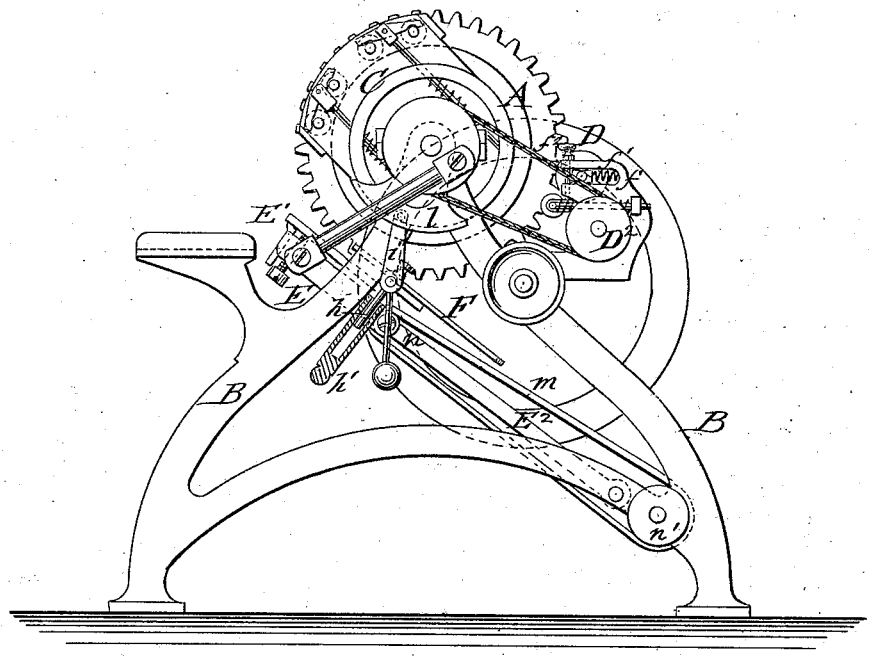

Be it known that we, FREDERICK WM. GRIFFITH and GEORGE P. BYRNE, of the city, county, and State of New York, have invented a new and Improved Printing-Press, of which the following is a specification:

In the accompanying drawing, Figure 1 represents an end elevation of our improved printing-press, partly in section, to show driving-gear of roller-frame. Fig. 2 is a vertical transverse section, taken on the line *c c*, Fig. 1; Fig. 3, a side elevation, and Fig. 4 a top view, of the same.

Our invention relates to printing-presses; and consists in a novel construction, combination, and arrangement of parts which have for their object to greatly simplify the same, improve their operation, increase their capacity, and to improve the same generally, as will be fully hereafter set forth.

The cylinder is secured in stationary position to the supporting-standards, the chase being securely held without screws or clamps to its inclined bed. The inking-rollers revolve around the cylinder, their frame being on journals of the cylinder-hubs, motion being transmitted from the driving-shaft by suitable gear-wheels, in connection with side bevel-wheels on the latter and on the roller-frame, and an intermediate removable pinion.

The inking-rollers are supplied with ink by a revolving and longitudinally-reciprocating changer or roller, an intermediate connecting-roller, and a lower driving-roller.

A spring-guide frame with adjustable fingers is connected with the swinging platen-frame, and retains the sheets until it is released from the platen by its upright arms coming in contact with sector-cams on right and left wheels of the cylinder-shaft. The sheets pass then on tapes stretched on rollers of the platen-frame to a receptacle.

In the drawing which represents our improved printing-press, A represents the cylinder of suitable size and diameter, which is supported on the usual side standards B of the press-frame by extending the cylinder-hubs at both ends, and resting the square outer ends of the same in corresponding slots and fastening-caps of the standards. The cylinder is thereby retained rigidly in stationary position, while the central shaft A' of the same, passing through the entire length of the tubular hub so extended, is made to revolve by means of gear-wheels in connection with the driving-shaft, transmitting motion to the parts at opposite side of cylinder A. The portion of the cylinder-hubs between the standards and the cylinder is turned round, to be used as a shaft for the roller-frame C, to which revolving motion is imparted by a bevel-gear, *a*, at its outer face, that gears by an intermediate bevel-pinion, *b*, with the bevel-gear *d* on inner face of the cog-wheel of the revolving cylinder-shaft. The shaft of the bevel-pinion *b* is supported on the cap of the cylinder-hub, the pinion being removable to allow the roller-frames, connected by rods, or by a similar transmission-gearing at the opposite side, to be placed in variable position. By this location of operating mechanism the roller-frame is revolved in the reverse direction to the driving gear-wheel. The inking-rollers C' are set in the usual manner into spring-acted bearings of the roller-frame C, and pass around the surface of the stationary cylinder, distributing the ink to a very fine grain thereon. The cylinder is constructed with the chase-bed at the usual angle and in the ordinary location in front, and with flanges or sides *a'* on each side of the bed at right angles to the axis of the cylinder. These sides are grooved parallel with the face of the bed, and the grooves terminate at their lower extremity in a stop or seat, as shown. Between these sides and in the grooves therein the chase is held and rests on the seats at the bottom of the grooves. Thus, while the chase may be readily removed, it is securely held without springs or clamping device, and the downward motion of the inking-rollers tends to still further secure it in position, as will be seen hereafter.

The ink is partially distributed before it reaches the cylinder or the inking-rollers by means of three revolving rollers at rear of the press, of which the upper one, D, is a reciprocating and revolving roller, the second a medium connecting-roller, $D^1$, and the lower one the driving-roller $D^2$ set below and in close contact with the connecting-roller, and driven by belt-connection with right wheel of revolving cylinder-shaft. The roller D is simultaneously revolved and reciprocated from side to side by exterior lug and spiral groove of its shaft, or any other equivalent device. Its shaft-journals are placed in bearings that slide in horizontal grooves $f$ of the standards. The springs $f^1$ hold the roller D snugly against the inking-rollers during the passage of the same, and, when the rollers have passed, force the shaft-journals against the stop-pins $f^2$ in the opening of the grooves, thus bringing D to its original position before it was in contact with the inking-rollers.

The median connecting-roller $D^1$ revolves in bearings fastened in a forward-extending frame G, which slides in grooves below the line of the roller D. This forward-extending frame G is provided with anti-friction rollers $g^2$, which come in contact with the cam-edge $g^3$ at the outer extremity of the roller-frame C, which holds the rollers $C'$. By this pressure of the roller-frame the roller $D'$ is forced backward, so as to suspend its contact with the roller D in anticipation of the necessary backward motion of D by the inking-rollers, and when the inking-rollers have passed D, the spiral springs $g^1$ at sides of the frame force $D^1$ into contact with D. But, although $D^1$ is separated from D during this passage of the inking-rollers, its contact is maintained with $D^2$, which is stationary, and is the driving-roller of the inking mechanism. This interval of separation between D and $D^1$ is also the time when $D^1$ will take a fresh supply of ink from a suitable fountain.

The operation of the rollers is as follows: Suppose the inking-rollers at the top of the cylinder. The motion is applied and the three rollers D $D^1$ $D^2$, taking motion from the latter, commence the work of distribution, and maintain their triple contact until the inking-rollers have descended over the form and are ascending the rear section of the cylinder, when the rim of roller-frame strikes the wheels $g^2$. This pressure suspends the contact of $D^1$ with D. Immediately the inking-rollers engage D and take a fresh supply of distributed ink. When the rim has passed wheels $g^2$ and the inking-rollers have passed D, which is simultaneous, the springs $g^1$ force $D^1$, and the springs $f^1$ force D forward into their normal position of triple contact, and the distribution, which, since the touching of the roller-rim on $g^2$ has been maintained only between $D^2$ and $D^1$, is resumed by the three rollers D $D^1$ $D^2$, and continued until in another revolution of the press the roller-frame touches $g^2$.

The downward motion of the inking-rollers over the front part of the cylinder, and when inking the form, contribute to press the chase firmly in its seats at the bottom of the grooves.

The platen-frame E, with its platen $E^1$, swings in the customary manner on arms $E^2$ pivoted to the lower portion of the standards. The motion is imparted by crank-disk connection with the cog-shaft. The platen $E^1$ is made adjustable, and provided with a guide-frame, F, that works by means of spring-acted or weighted guide-rods in cylindrical or other supporting-sockets $h'$, which are either fastened firmly or pivoted to the arms of the platen-frame.

The fingers of the guide-frame are so constructed by slots, bearings, and set-screws that they may be brought with perfect accuracy to any position on the platen, and held at the same time firmly in position against any motion, either in sidewise, upward, or downward direction.

Figure 4:
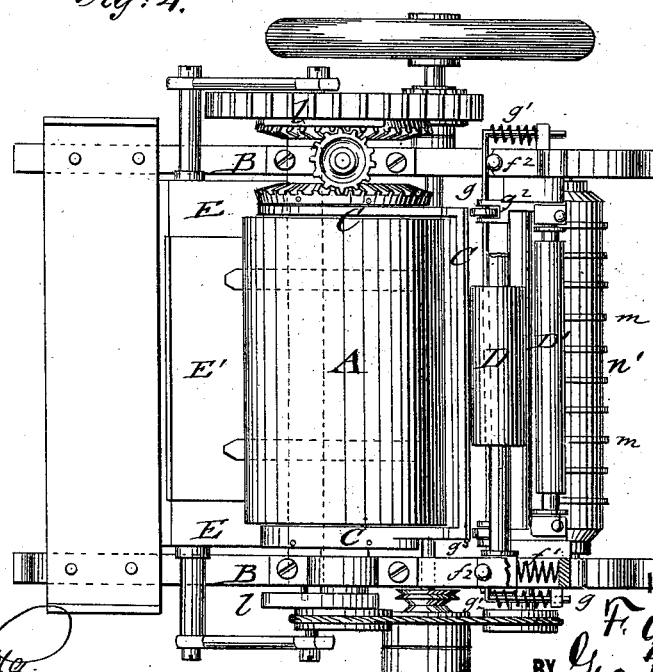

Extension-arms $i$ with friction-rollers at the ends are applied to the guide-frame in such a manner that the flanged sector-cams $l$ on the right and left wheels of the cylinder-shaft, Fig. 4, engage the arms $i$, and hold the guide-frame stationary while the platen is descending, keeping it suspended long enough to allow the printed sheets to pass off below the same. On release of the sector-cams $l$ the guide-frame is carried back to the platen by means of springs or weights of the guide-rods.

The printed sheets are conveyed from the platen E by means of tapes $m$ stretched on a revolving roller, $n$, below the movable platen $E'$, and a lower driving-roller, $n'$, having belt-connection with pulley on the driving-shaft, to a suitable receptacle to be deposited therein. These tapes are situated in a plane substantially with the platen.

The sheets may, by this arrangement, be fed with greater rapidity to the press, as the operator is relieved from taking out the printed sheets by the action of the sheet-conveying tapes.

We claim—

1. The combination of the roller-frame C, provided with cam-edge $g^3$, laterally-sliding connecting-roller $D^1$, and longitudinally-reciprocating changer D, for suspending contact of the latter with the former during the passage of the inking-rollers against the changer D, constructed and operating substantially in the manner described and specified.

2. The combination, with the platen $E^1$, platen-frame E, and guide-frame F, of the conveying-tapes $m$, arranged in substantially the same plane with the platen, substantially as described and specified.

3. The combination of the receiving and driving roller $D^2$, reciprocating revolving roller D, and intermediate connecting-roller $D^1$, with the roller-frame C, rollers $C'$, and stationary distributing-cylinder A, constructed and operating substantially in the manner described and specified.

4. The combination, with the stationary cylinder A, having a chase-bed with grooved flanges, which are in a plane at right angles to the axis of the cylinder and terminate in seats for supporting the chase, of the inking-rollers $C'$ and frame C, which revolve down over the chase, so as to tend to retain and force it into place between said flanges, substantially in the manner described and specified.

5. The adjustable platen E¹, combined with guide-frame F and socketed guide-rods $h$, as and for the purpose specified.

6. The arms $i$ and cams $l$ combined with guide-frame, as and for the purpose described.

7. The combination of the roller-frame C, gear-wheel $a$, shaft A′, gear-wheel $d$, and single intermediate pinion $b$ connecting the shaft and roller-frame, so that said roller-frame will revolve in the reverse direction to the driving-gear wheel, substantially in the manner described and specified.

FREDERICK WM. GRIFFITH.
GEO. P. BYRNE.

Witnesses:
T. B. MOSHER,
ALEX. F. ROBERTS.